United States Patent
Oh et al.

(10) Patent No.: US 10,303,275 B2
(45) Date of Patent: May 28, 2019

(54) TOUCH DISPLAY DEVICE AND METHOD FOR DRIVING THE SAME

(71) Applicant: LG Display Co., Ltd., Seoul (KR)

(72) Inventors: Dae-Seok Oh, Gyeonggi-do (KR); Ju-Young Lee, Gyeonggi-do (KR); Bo-Gun Seo, Gyeonggi-do (KR); Hak-Su Kim, Daegu (KR); Yong-Hwa Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 750 days.

(21) Appl. No.: 14/480,866

(22) Filed: Sep. 9, 2014

(65) Prior Publication Data

US 2015/0091826 A1  Apr. 2, 2015

(30) Foreign Application Priority Data

Sep. 27, 2013  (KR) .......................... 10-2013-0115445

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC .......... G06F 3/038; G06F 3/041; G06F 3/044; G06F 3/045; G06F 3/0416; G09G 3/32; G09G 3/36; G09G 5/00; G09G 5/10; G09G 5/18; G02F 1/133; G02F 1/1333
See application file for complete search history.

(56) References Cited

U.S. PATENT DOCUMENTS

| 6,184,853 B1 * | 2/2001 | Hebiguchi ........... G09G 3/3607 345/589 |
| 8,866,783 B2 | 10/2014 | Saitoh et al. |
| 8,872,783 B2 | 10/2014 | Saitoh et al. |

(Continued)

FOREIGN PATENT DOCUMENTS

| CN | 102375639 A | 3/2012 |
| CN | 102402330 A | 4/2012 |

(Continued)

OTHER PUBLICATIONS

Chinese Office Action, dated Feb. 4, 2017, for counterpart Chinese patent application No. 201410419888.2.

(Continued)

*Primary Examiner* — Chanh D Nguyen
*Assistant Examiner* — Nguyen H Truong
(74) *Attorney, Agent, or Firm* — Morgan, Lewis & Bockius LLP

(57) ABSTRACT

A touch display device includes a touch display panel for displaying an image corresponding to a touch applied from outside the touch display device, a gate driver for sequentially driving all gate lines of the touch display panel once during a unit field period including at least two continuous field periods, in such a manner that a total gate driving period corresponding to a sum of individual gate driving periods of all gate lines is shorter than the unit field period, and a touch control unit for defining periods of the unit field period other than the total gate driving period, as a touch sensing period, and performing an operation for sensing a touch on the touch display panel during the touch sensing period.

11 Claims, 9 Drawing Sheets

(56) References Cited

U.S. PATENT DOCUMENTS

| | | | | |
|---|---|---|---|---|
| 2006/0044251 A1* | 3/2006 | Kato | ............... | G09G 3/3611 |
| | | | | 345/98 |
| 2010/0007631 A1 | 1/2010 | Chang | | |
| 2011/0164017 A1* | 7/2011 | Chung | ............ | G09G 3/3266 |
| | | | | 345/211 |
| 2012/0013565 A1* | 1/2012 | Westhues | ........ | G06F 3/0418 |
| | | | | 345/174 |
| 2012/0050217 A1* | 3/2012 | Noguchi | ......... | G06F 3/0412 |
| | | | | 345/174 |
| 2012/0056835 A1* | 3/2012 | Choo | ............... | G06F 3/0412 |
| | | | | 345/173 |
| 2012/0105752 A1* | 5/2012 | Park | ............... | G02F 1/13338 |
| | | | | 349/33 |
| 2013/0314360 A1* | 11/2013 | Saitoh | ............ | G06F 3/0412 |
| | | | | 345/173 |
| 2013/0314361 A1* | 11/2013 | Saitoh | ............ | G06F 3/0412 |
| | | | | 345/173 |
| 2014/0022476 A1* | 1/2014 | Park | ............... | G02F 1/13306 |
| | | | | 349/41 |
| 2014/0340349 A1* | 11/2014 | Liu | ................. | G06F 3/041 |
| | | | | 345/174 |

FOREIGN PATENT DOCUMENTS

| | | |
|---|---|---|
| CN | 102455536 A | 5/2012 |
| CN | 103299255 A | 9/2013 |
| CN | 103299359 A | 9/2013 |

OTHER PUBLICATIONS

Chinese Office Action, dated Sep. 6, 2017, for the counterpart Chinese patent application No. 201410419888.2.

* cited by examiner

FP1

FP2

FP3

FP4

TOUCH DISPLAY DEVICE AND METHOD FOR DRIVING THE SAME

This application claims the benefit of Korean Patent Application No. 10-2013-0115445, filed on Sep. 27, 2013, which is hereby incorporated by reference as if fully set forth herein.

BACKGROUND OF THE INVENTION

Field of the Invention

The present invention relates to a touch display device and, more particularly, to a touch display device capable of sufficiently ensuring a gate driving time and a touch sensing time and reducing power consumption using an interlaced scan mode, and a method for driving the same.

Discussion of the Related Art

A related art touch display device drives all gate lines and determines whether a touch is sensed, in one field period. Since the number of gate lines to be driven in one field period is increased in proportion to the resolution of the touch display device, a gate line driving time and a touch sensing time within the one field period are inevitably reduced in a high-resolution touch display device. As such, the quality of image may be reduced due to an insufficient pixel charging time, and a touch or a touch area may not be accurately determined without an error due to an insufficient touch sensing time.

SUMMARY OF THE INVENTION

Accordingly, the present invention is directed to a touch display device that substantially obviates one or more problems due to limitations and disadvantages of the related art.

An object of the present invention is to provide a touch display device capable of sufficiently ensuring a gate driving time and a touch sensing time and reducing power consumption using an interlaced scan mode, and a method for driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch display device includes a touch display panel for displaying an image corresponding to a touch applied from outside the touch display device, a gate driver for sequentially driving all gate lines of the touch display panel once during a unit field period including at least two continuous field periods, in such a manner that a total gate driving period corresponding to a sum of individual gate driving periods of all gate lines is shorter than the unit field period, and a touch control unit for defining periods of the unit field period other than the total gate driving period, as a touch sensing period, and performing an operation for sensing a touch on the touch display panel during the touch sensing period.

In another aspect of the present invention, a method for driving a touch display device includes step A for sequentially driving all gate lines of a touch display panel once during a unit field period including at least two continuous field periods, in such a manner that a total gate driving period corresponding to a sum of individual gate driving periods of all gate lines is shorter than the unit field period, and step B for defining periods of the unit field period other than the total gate driving period, as a touch sensing period, and performing an operation for sensing a touch on the touch display panel during the touch sensing period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
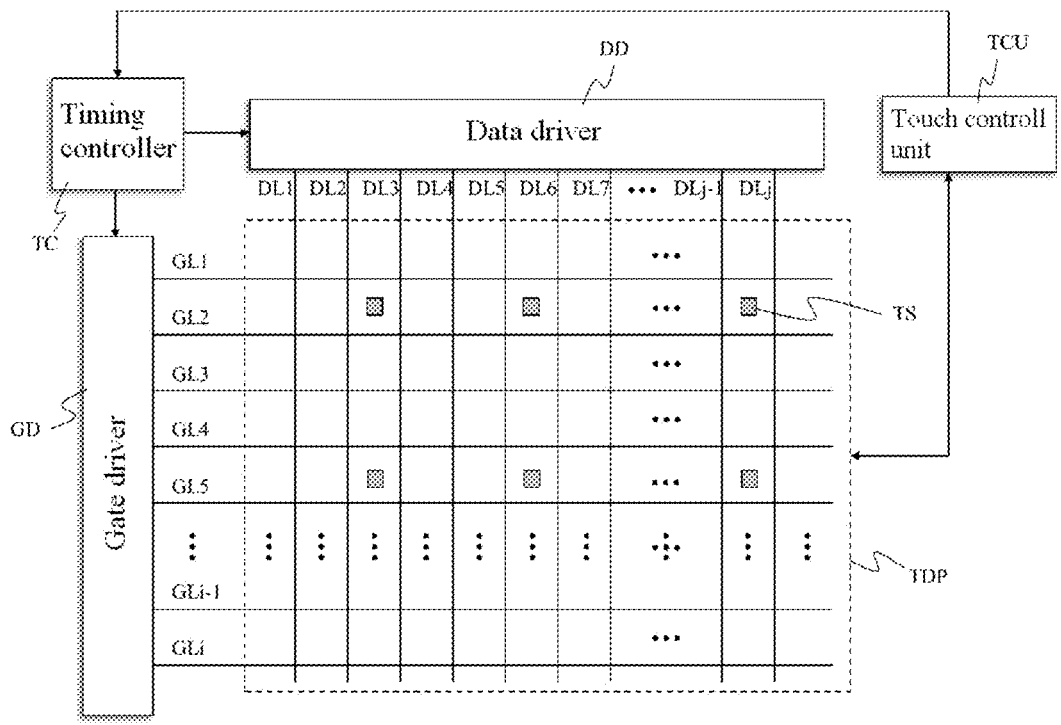
FIG. 1 is a block diagram of a touch display device according to a first embodiment of the present invention.

FIG. 1 is a block diagram of a touch display device according to a first embodiment of the present invention.

As illustrated in FIG. 1, the touch display device according to the first embodiment of the present invention includes a touch display panel TDP, a touch control unit TCU, a timing controller TC, a gate driver GD, and a data driver DD.

The touch display panel TDP displays an image corresponding to image data input to the touch display panel TDP through the timing controller TC and the data driver DD, and also displays an image corresponding to a touch applied from outside the touch display device. To this end, the touch display panel TDP includes n pixels (n is a natural number greater than 1) for displaying an image and m touch sensors TS (m is a natural number greater than 1) for sensing a touch applied from outside the touch display device. One touch sensor TS is formed for k pixels (k is a natural number greater than 1) in the touch display panel TDP. Here, the n pixels are respectively formed in n pixel areas defined by gate lines GL1 to GLi and data lines DL1 to DLj which cross each other.

The touch sensor TS is a capacitive touch sensor. The touch sensor TS senses a touch applied to a display of the touch display panel TDP by a finger or a separate touch tool. The touch sensor TS outputs a touch sensing signal having a value greater than that of a preset reference signal when a touch is not applied to the display, and outputs a touch sensing signal having a value less than that of the reference signal when a touch is applied to the display of the touch display panel TDP.

The gate driver GD sequentially drives all gate lines GL1 to GLi of the touch display panel TDP once during a unit field period including at least two continuous field periods. However, the gate driver GD drives the gate lines GL1 to GLi in such a manner that a total gate driving period corresponding to a sum of individual gate driving periods of all gate lines GL1 to GLi is shorter than the unit field period. Simply, for example, if one unit field period includes two continuous field periods, the gate driver GD may drive all gate lines once in the first field period, and drive no gate line in the second field period. In this case, the total gate driving period corresponds to the length of the first field period, and thus is less than the unit field period, i.e., the length of the two continuous field periods. As another example, under the above-described condition, the gate driver GD may drive ½ of all gate lines (e.g., odd-number gate lines) once during a period corresponding to ½ of the first field period and drive the other ½ of all gate lines (e.g., even-number gate lines) once during a period corresponding to ½ of the second field period. In this case, the total gate driving period also corresponds to the length of the first field period, and thus is less than the unit field period, i.e., the length of the two continuous field periods. That is, in the above two cases, only driving periods of the gate lines are different and the total gate driving period corresponds to the length of one field period. Eventually, in one unit field period, a time corresponding to one field period is still available after all gate lines are driven once. In the present invention, this available time is used to sense a touch on the touch display panel TDP, and thus a touch sensing time is increased compared to a conventional case.

The touch control unit TCU defines periods of the unit field period other than the total gate driving period, as a touch sensing period, and performs an operation for sensing a touch on the touch display panel TDP during the touch sensing period. For example, during the touch sensing period, the touch control unit TCU operates the m touch sensors TS, analyzes m touch sensing signals provided therefrom to determine whether a touch is applied, and calculates a coordinate of an area to which the touch is applied (hereinafter referred to as a touch area) (e.g., touch block) upon determining that the touch is applied. Then, the touch control unit TCU provides the calculated coordinate to the timing controller TC.

The timing controller TC compensates image data input from an external device, based on the coordinate of the touch area provided from the touch control unit TCU, and provides the compensated image data to the data driver DD. In addition, the timing controller TC generates a data control signal and a gate control signal using a horizontal synchronization signal, a vertical synchronization signal, and a dot clock provided from an external device. The data control signal is a signal for controlling operation of the data driver DD, and provided to the data driver DD. The gate control signal is a signal for controlling the gate driver GD, and provided to the gate driver GD.

The data driver DD converts the compensated image data provided from the timing controller TC, into an analog signal using a gamma voltage from a gamma voltage generation unit (not shown), and provides the analog-converted image data to the pixels of the touch display panel TDP.

Figure 2:
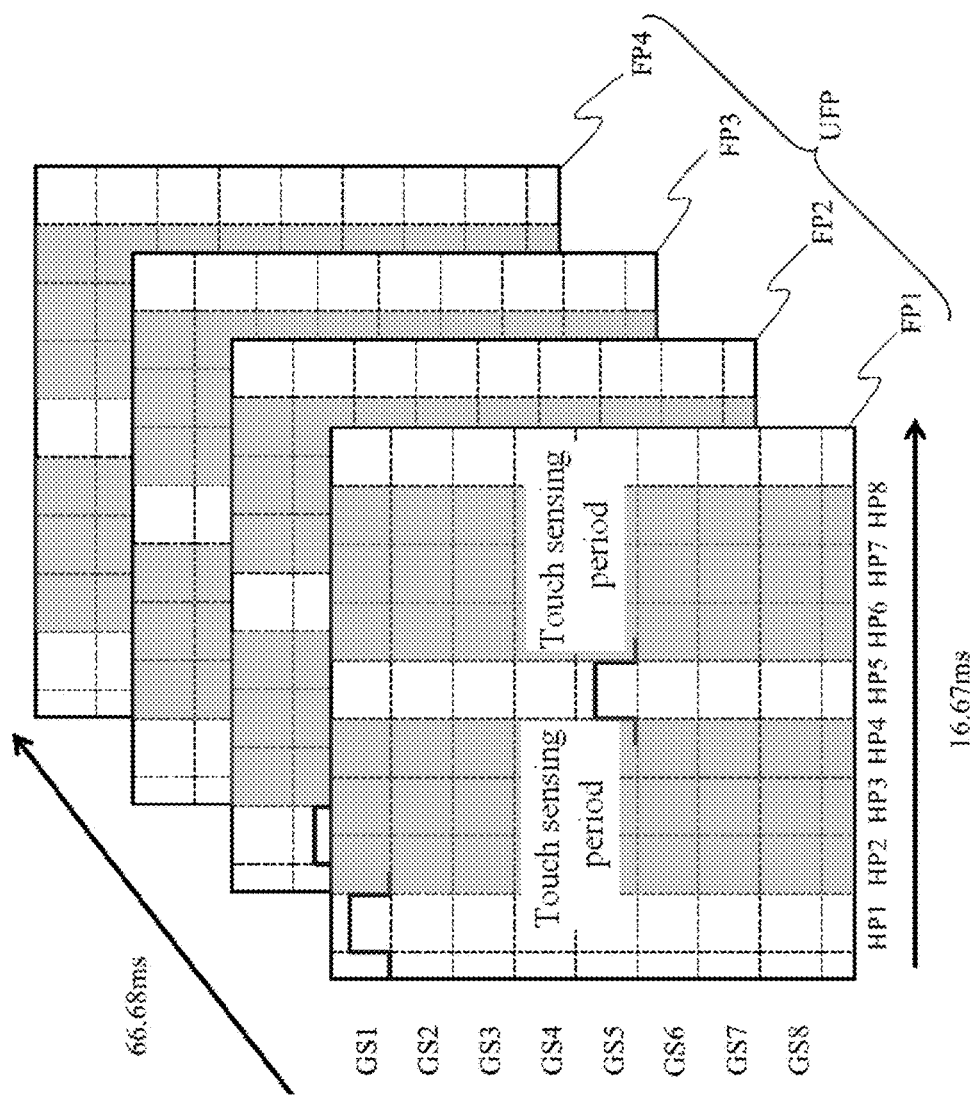
FIGS. 2 to 4 are diagrams for describing a method for driving the touch display device, according to the first embodiment of the present invention.
Figure 3:
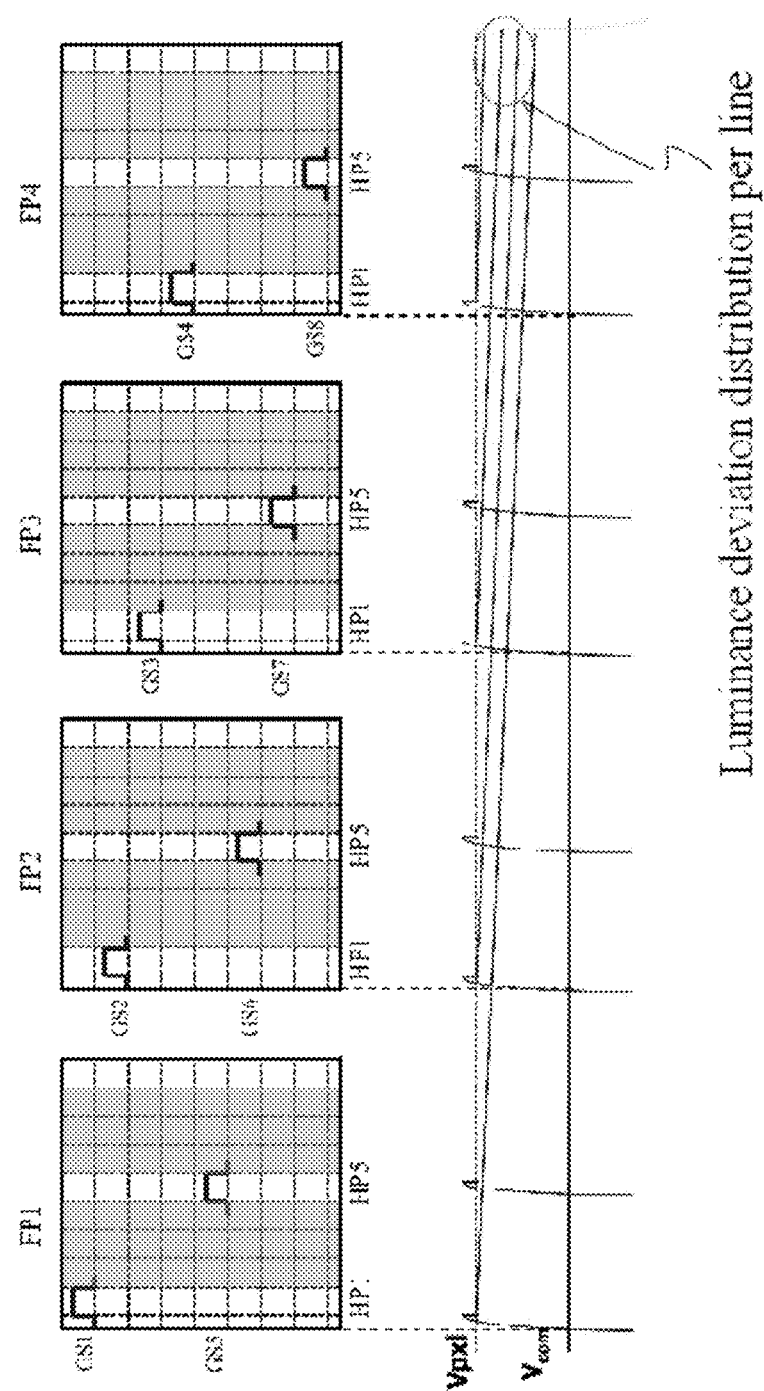
Figure 4:
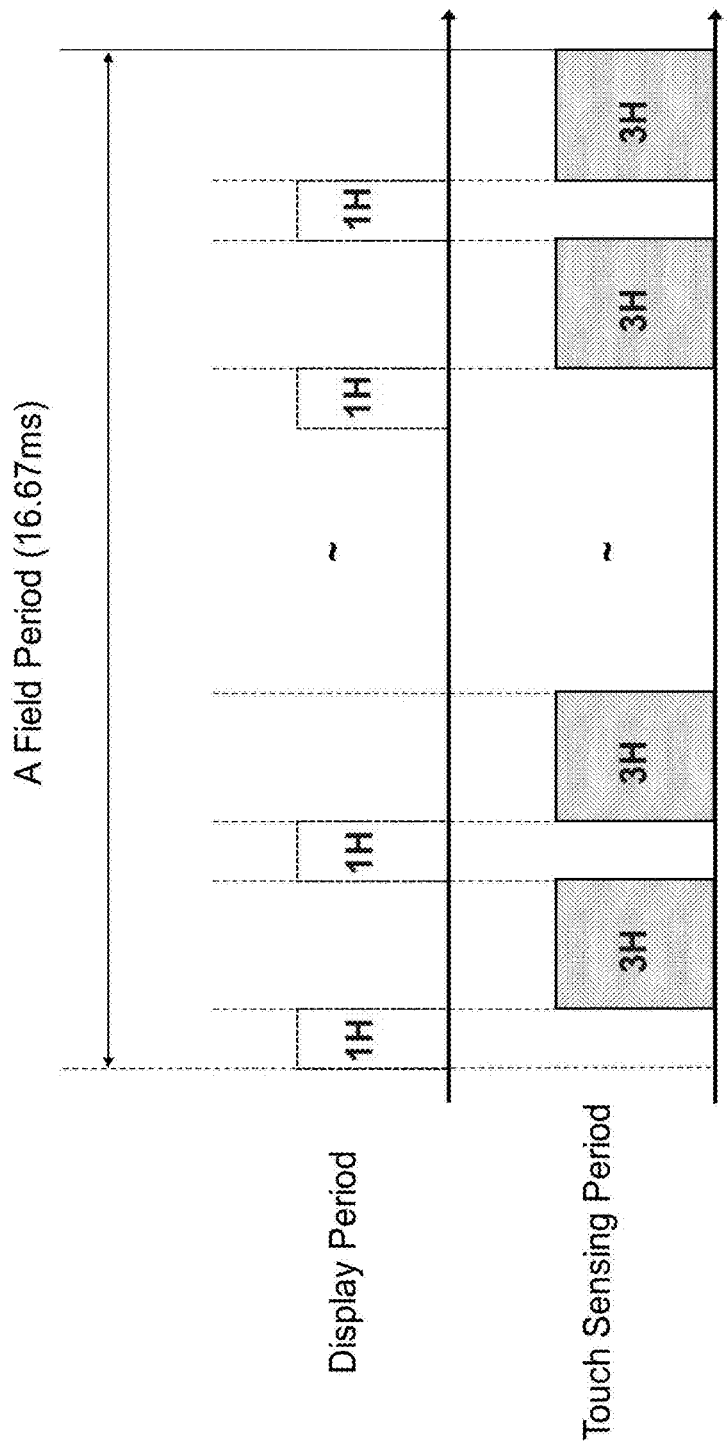

FIGS. 2 to 4 are diagrams for describing a method for driving the touch display device, according to the first embodiment of the present invention. Here, for convenience of explanation, only a few gate lines (e.g., eight gate lines GL1 to GL8) are illustrated in FIG. 2.

The method according to the first embodiment of the present invention uses an interlaced scan mode and, more particularly, a 4field-4scan type interlaced scan mode in which one unit field period UFP includes four continuous field periods FP1 to FP4 and i/4 gate lines are driven in each of the field periods FP1 to FP4.

As illustrated in FIGS. 2 and 3, the gate driver GD operating according to the 4field-4scan type interlaced scan mode sequentially drives (4n+1)th gate lines GL1 and GL5 (n is a natural number including 0) during the first field period FP1, sequentially drives (4n+2)th gate lines GL2 and GL6 during the second field period FP2, sequentially drives (4n+3)th gate lines GL3 and GL7 during the third field period FP3, and then sequentially drives (4n+4)th gate lines GL4 and GL8 during the fourth field period FP4. For example, as illustrated in FIG. 3, the gate driver GD respectively and sequentially outputs the first and fifth gate signals GS1 and GS5 to the first and fifth gate lines GL1 and GL5 in first and fifth horizontal periods HP1 and HP5 of the first field period FP1, respectively and sequentially outputs the second and sixth gate signals GS2 and GS6 to the second and sixth gate lines GL2 and GL6 in the first and fifth horizontal periods HP1 and HP5 of the second field period FP2, respectively and sequentially provides the third and seventh gate signals GS3 and GS7 to the third and seventh gate lines GL3 and GL7 in the first and fifth horizontal periods HP1 and HP5 of the third field period FP3, and then respectively and sequentially provides the fourth and eighth gate signals GS4 and GS8 to the fourth and eighth gate lines GL4 and GL8 in the first and fifth horizontal periods HP1 and HP5 of the fourth field period FP4.

In this case, the touch control unit TCU defines periods of the first field period FP1 other than periods in which the (4n+1)th gate lines GL1 and GL5 are driven, periods of the second field period FP2 other than periods in which the (4n+2)th gate lines GL2 and GL6 are driven, periods of the third field period FP3 other than periods in which the (4n+3)th gate lines GL3 and GL7 are driven, and periods of the fourth field period FP4 other than periods in which the (4n+4)th gate lines GL4 and GL8 are driven, as a touch sensing period. For example, in FIG. 2, second to fourth horizontal periods HP2 to HP4 and sixth to eighth horizontal periods HP6 to HP8 of each of the field periods FP1 to FP4 may be included in the touch sensing period.

As illustrated in FIG. 3, since gate lines are driven in every field period without skipping any one field period, luminance deviation per line may be reduced even in the interlaced scan mode. In FIG. 3, Vpxl refers to a pixel voltage applied to a pixel, and Vcom refers to a common voltage.

FIG. 4 shows the lengths of a display period and a touch sensing period included in (4n+1)th field periods of FIG. 2.

As illustrated in FIG. 4, since each of (4n+1)th gate lines is driven for a time corresponding to the length of one horizontal period (1H) in one field period, the (4n+1)th gate lines are sequentially driven with a time interval corresponding to the length of three horizontal periods (3H). In this case, a touch sensing operation is performed for a time corresponding to the time interval. As such, in one field period, the length of the display period corresponds to the value of 1H*(the number of (4n+1)th gate lines), and the length of the touch sensing period corresponds to the value of 3H*(the number of (4n+1)th gate lines).

Figure 5:
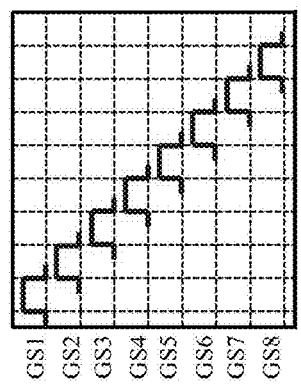
FIG. 5 is a diagram for describing a method for driving a touch display device according to a second embodiment of the present invention.
Figure 5:
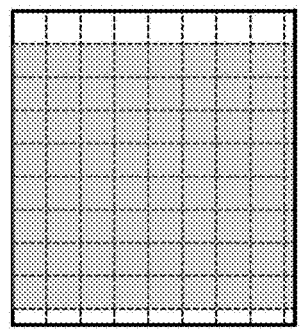
Figure 5:
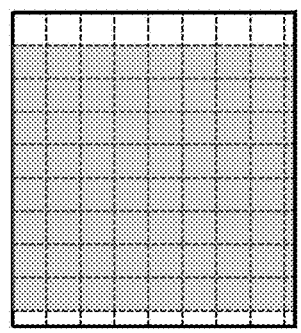
Figure 5:
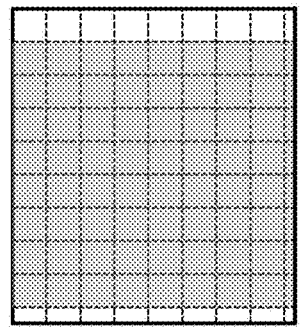

FIG. 5 is a diagram for describing a method for driving a touch display device according to a second embodiment of the present invention. Here, for convenience of explanation, only a few gate lines (e.g., eight gate lines GL1 to GL8) are illustrated in FIG. 5.

The method according to the second embodiment of the present invention uses another interlaced scan mode and, more particularly, a 4field-1scan-3skip type interlaced scan mode in which one unit field period UFP includes four continuous field periods FP1 to FP4, all gate lines GL1 to GLi are driven during the first field period FP1, and no gate line is driven during the other second to fourth field periods FP2 to FP4.

As illustrated in FIG. 5, the gate driver GD operating according to the 4field-1scan-3skip type interlaced scan mode sequentially drives all gate lines GL1 to GLi by providing i gate signals (all gate signals including GL1 to GL8) to the gate lines GL1 to GLi during the first field period FP1, and drives no gate line during the second to fourth field periods FP2 to FP4. In this case, the touch control unit TCU defines the second to fourth field periods FP2 to FP4 as a touch sensing period.

Figure 6:
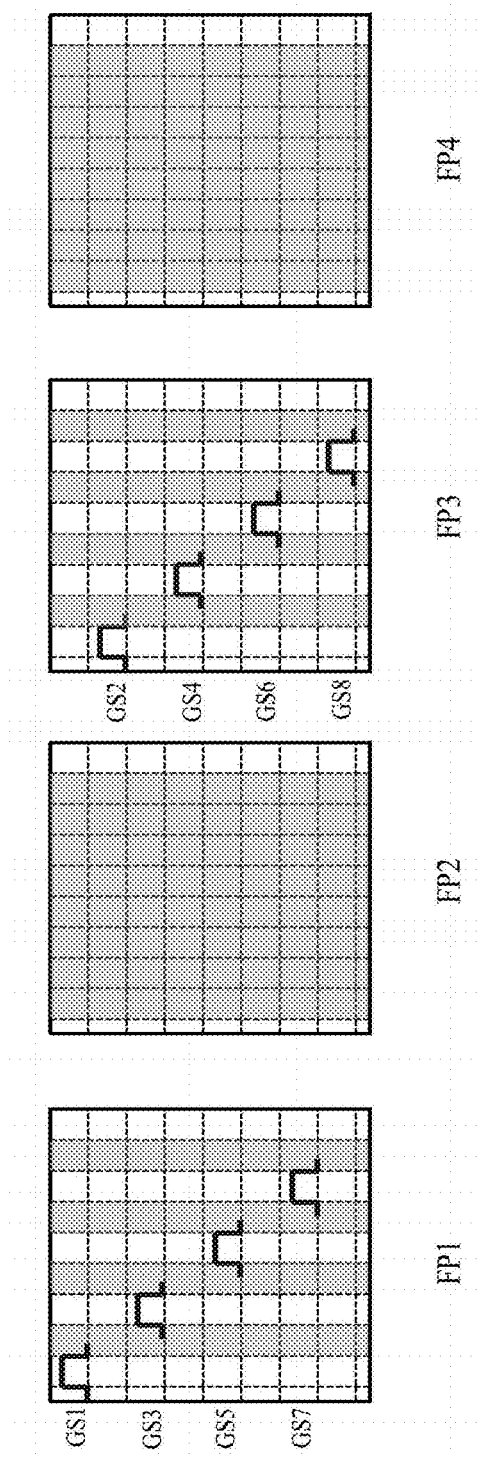
FIG. 6 is a diagram for describing a method for driving a touch display device according to a third embodiment of the present invention.

FIG. 6 is a diagram for describing a method for driving a touch display device according to a third embodiment of the present invention. Here, for convenience of explanation, only a few gate lines (e.g., eight gate lines GL1 to GL8) are illustrated in FIG. 6.

The method according to the third embodiment of the present invention uses another interlaced scan mode and, more particularly, a 4field-2scan-2skip type interlaced scan mode in which one unit field period UFP includes four continuous field periods FP1 to FP4, i/2 gate lines are driven in each of the first and third field periods FP1 and FP3, and no gate line is driven in the other second and fourth field periods FP2 and FP4.

As illustrated in FIG. 6, the gate driver GD operating according to the 4field-2scan-2skip type interlaced scan mode sequentially drives (2n+1)th gate lines GL1, GL3, GL5, and GL7 by providing (2n+1)th gate signals GS1, GS3, GS5, and GS7 respectively to the (2n+1)th gate lines GL1, GL3, GL5, and GL7 during the first field period FP1, drives no gate line during the second field period FP2, sequentially drives (2n+2)th gate lines GL2, GL4, GL6, and GL8 by providing (2n+2)th gate signals GS2, GS4, GS6, and GS8 respectively to the (2n+2)th gate lines GL2, GL4, GL6, and GL8 during the third field period FP3, and then drives no gate line during the fourth field period FP4. In this case, the touch control unit TCU defines periods of the first field period FP1 other than periods in which the (2n+1)th gate lines GL1, GL3, GL5, and GL7 are driven, the second field period FP2, periods of the third field period FP3 other than periods in which the (2n+2)th gate lines GL2, GL4, GL6, and GL8 are driven, and the fourth field period FP4, as a touch sensing period.

Figure 7:
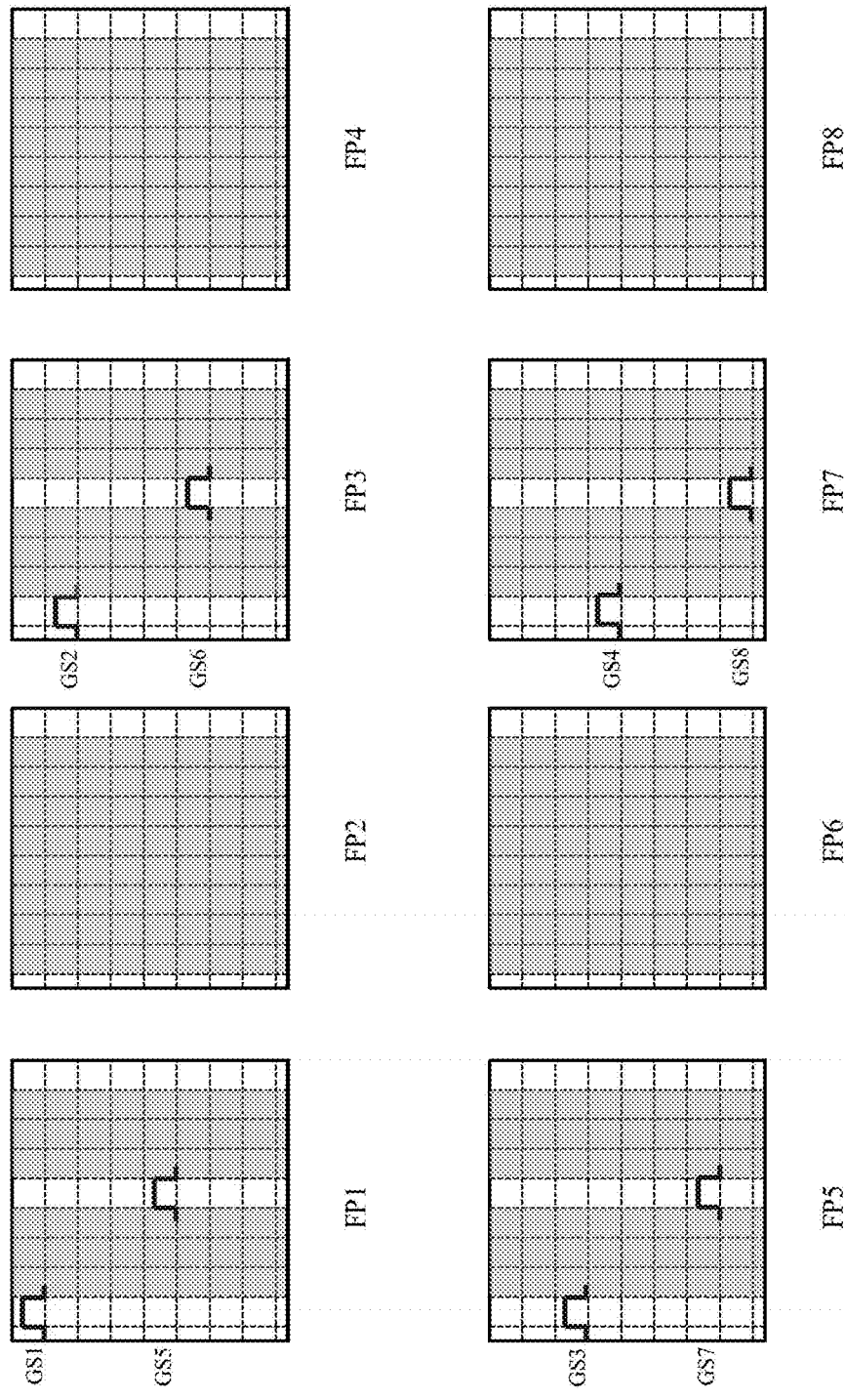
FIG. 7 is a diagram for describing a method for driving a touch display device according to a fourth embodiment of the present invention.

FIG. 7 is a diagram for describing a method for driving a touch display device according to a fourth embodiment of the present invention. Here, for convenience of explanation, only a few gate lines (e.g., eight gate lines GL1 to GL8) are illustrated in FIG. 7.

The method according to the fourth embodiment of the present invention uses another interlaced scan mode and, more particularly, a 8field-4scan-4skip type interlaced scan mode in which one unit field period UFP includes eight continuous field periods FP1 to FP8, i/4 gate lines are driven in each of the first, third, fifth, and seventh field periods FP1, FP3, FP5, and FP7, and no gate line is driven in the other second, fourth, sixth, and eighth field periods FP2, FP4, FP6, and FP8.

As illustrated in FIG. 7, the gate driver GD operating according to the 8field-4scan-4skip type interlaced scan mode sequentially drives (4n+1)th gate lines GL1 and GL5 by providing (4n+1)th gate signals GS1 and GS5 to the (4n+1)th gate lines GL1 and GL5 during the first field period FP1, drives no gate line during the second field period FP2, sequentially drives (4n+2)th gate lines GL2 and GL6 by providing (4n+2)th gate signals GS2 and GS6 to the (4n+2)th gate lines GL2 and GL6 during the third field period FP3, drives no gate line during the fourth field period FP4, sequentially drives (4n+3)th gate lines GL3 and GL7 by providing (4n+3)th gate signals GS3 and GS7 to the (4n+3)th gate lines GL3 and GL7 during the fifth field period FP5, drives no gate line during the sixth field period FP6, sequentially drives (4n+4)th gate lines GL4 and GL8 by providing (4n+4)th gate signals GS4 and GS8 to the (4n+4)th gate lines GL4 and GL8 during the seventh field period FP7, and then drives no gate line during the eighth field period FP8. In this case, the touch control unit TCU defines periods of the first field period FP1 other than periods in which the (4n+1)th gate lines GL1 and GL5 are driven, the second field period FP2, periods of the third field period FP3 other than periods in which the (4n+2)th gate lines GL2 and GL6 are driven, the fourth field period FP4, periods of the fifth field period FP5 other than periods in which the (4n+3)th gate lines GL3 and GL7 are driven, the sixth field period FP6, periods of the seventh field period FP7 other than periods in which the (4n+4)th gate lines GL4 and GL8 are driven, and the eighth field period FP8, as a touch sensing period.

In FIGS. 3, 5, and 6, the gate driver GD drives all gate lines in an interlaced scan mode having a speed of 15 Hz. In FIG. 7, the gate driver GD drives all gate lines in an interlaced scan mode having a speed of 7.5 Hz. Alternatively, the gate driver GD may drive all gate lines in an interlaced scan mode having a speed of 5 Hz or 3.75 Hz.

Figure 8:
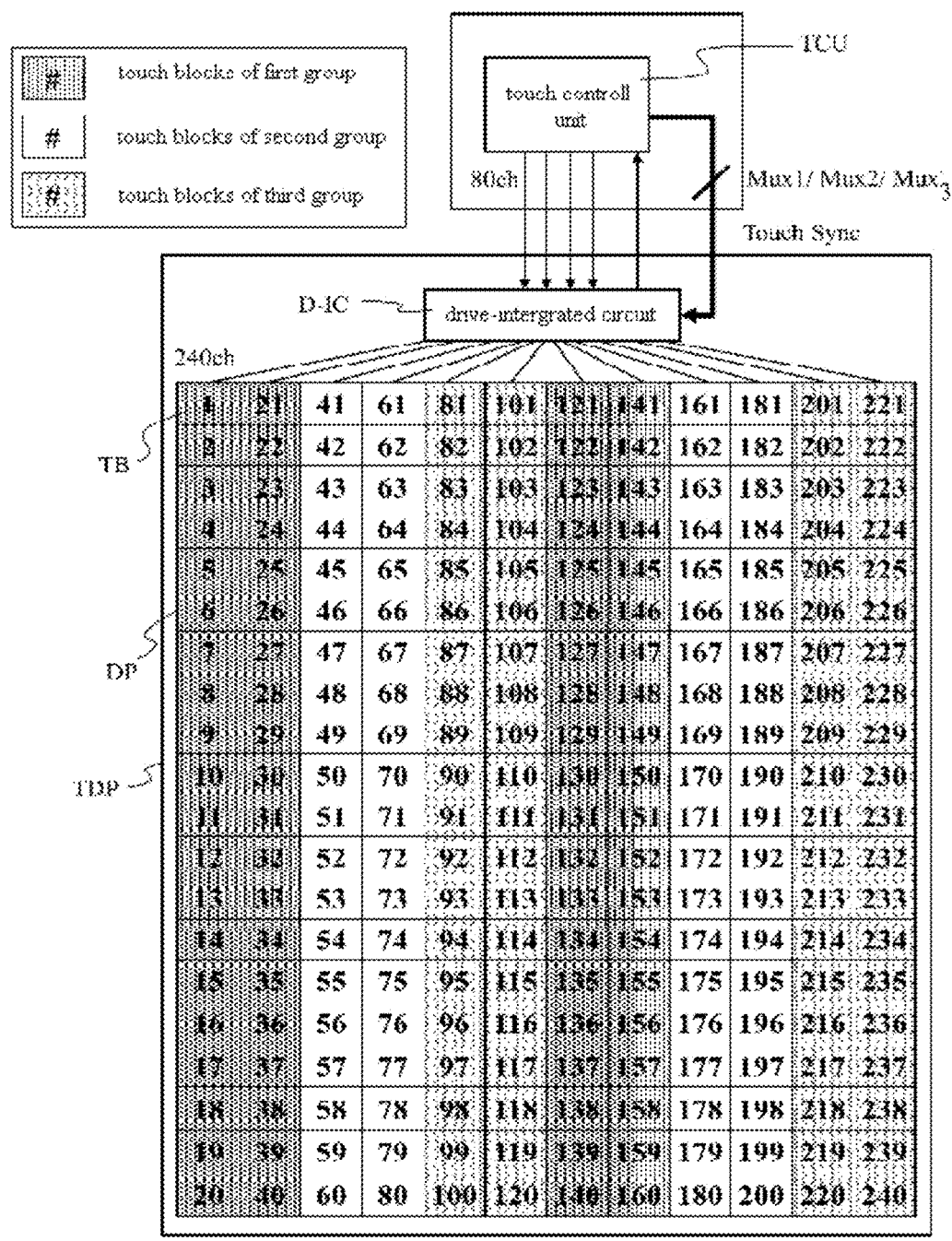
FIG. 8 is a block diagram of the touch display device according to the second embodiment of the present invention.
Figure 9:
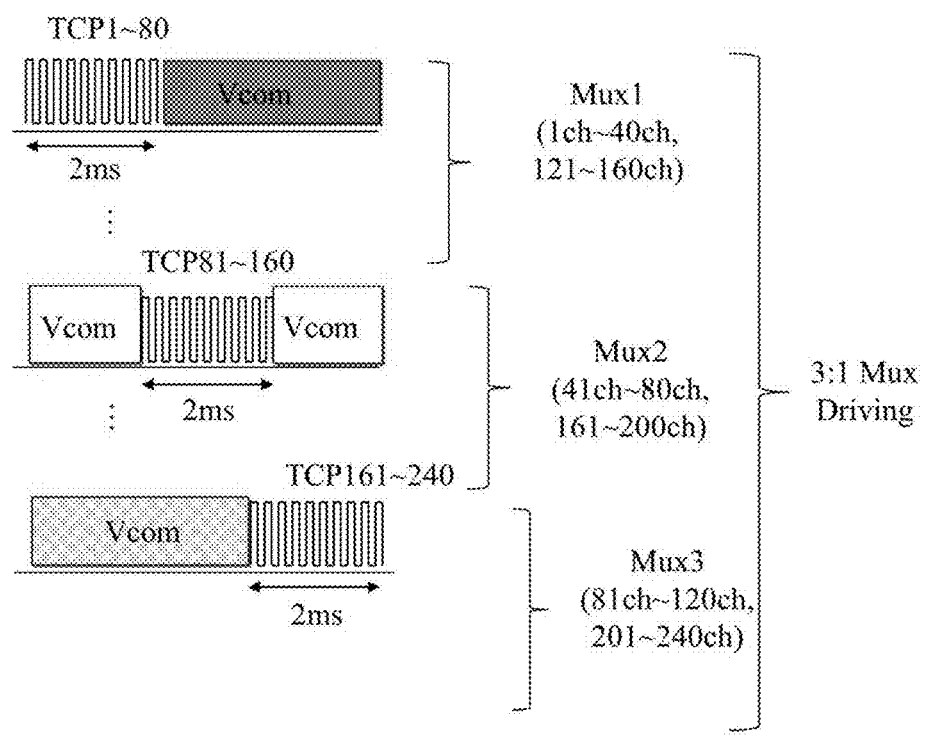
FIG. 9 is a timing diagram of touch pulses applied to the touch display device of FIG. 8.

FIG. 8 is a block diagram of the touch display device according to the second embodiment of the present invention, and FIG. 9 is a timing diagram of touch pulses applied to the touch display device of FIG. 8.

As illustrated in FIG. 8, the touch display device according to the second embodiment of the present invention includes a touch display panel TDP, a touch control unit TCU, and a drive-integrated circuit D-IC.

The drive-integrated circuit D-IC is an integrated circuit including the above described gate driver GD and the data driver DD of FIG. 1 therein, and performs functions of both the gate driver GD and the data driver DD. The drive-integrated circuit D-IC is included in the touch display panel TDP.

The touch display panel TDP is the same as that described above in relation to FIG. 1. Specifically, a display DP of the touch display panel TDP is divided into a plurality of touch blocks TB as illustrated in FIG. 8. Each touch block TB includes the above-described touch sensor TS. That is, one touch block TB includes a plurality of pixels, and one touch sensor TS is formed for one touch block TB. A common electrode (not shown) is formed in each touch block TB, and one common electrode is formed for one touch block TB. FIG. 8 exemplarily shows a total of 240 touch blocks TB. In this case, 240 touch sensors TS and 240 common electrodes are formed. Here, all common electrodes may not be connected to each other. According to another embodiment, the common electrodes included in the touch blocks TB arranged in a vertical direction may be electrically connected through one line. For example, the common electrodes included in #1 to #20 touch blocks TB may be electrically connected through a line, the common electrodes included in #21 to #40 touch blocks TB may be electrically connected through another line, and the common electrodes included in #41 to #60 touch blocks TB may be electrically connected through another line.

The touch control unit TCU defines periods of a unit field period other than a total gate driving period, as a touch sensing period, and performs an operation for sensing a touch on the touch display panel TDP during the touch sensing period. For example, during the touch sensing period, the touch control unit TCU analyzes m touch sensing signals provided from m touch sensors TS to determine whether a touch is applied, and calculates a coordinate of a touch area upon determining that the touch is applied. Then, the touch control unit TCU provides the calculated coordinate to the timing controller TC.

In particular, the touch control unit TCU applies a common voltage Vcom, which is a constant voltage, to the common electrodes of all touch blocks TB in a display period in which gate lines are driven, and applies touch pulses to the common electrodes in the touch sensing period in which gate lines are not driven. In this case, the touch pulses are applied to the common electrodes on a group basis. For example, as illustrated in FIG. 8, 240 touch blocks TB may be grouped into 3 groups. That is, #1 to #40 touch blocks TB and #81 to #160 touch blocks TB may be grouped into a first group, #41 to #80 touch blocks TB and #161 to #200 touch blocks TB may be grouped into a second group, #81 to #120 touch blocks TB and #201 to #240 touch blocks TB may be grouped into a third group. $1^{st}$ to $80^{th}$ touch pulses TCP1 to are sequentially or simultaneously applied to 80 touch blocks TB grouped as the first group, $81^{st}$ to $160^{th}$ touch pulses TCP81 to 160 are sequentially or simultaneously applied to 80 touch blocks TB grouped as the second group, and then $161^{st}$ to $240^{th}$ touch pulses TCP161 to 240 are sequentially or simultaneously applied to 80 touch blocks TB grouped as the third group. In this case, the $1^{st}$ to $80^{th}$ touch pulses TCP1 to 80 are applied to the common electrodes formed in the touch blocks of the first group through a first multiplexer Mux1, the $81^{st}$ to $160^{th}$ touch pulses TCP81 to 160 are applied to the common electrodes formed in the touch blocks of the second group through a second multiplexer Mux2, and the $161^{st}$ to $240^{th}$ touch pulses TCP161 to 240 are applied to the common electrodes formed in the touch blocks of the third group through a third multiplexer Mux3. Here, the first to third multiplexers Mux1 to Mux3 are included in the drive-integrated circuit D-IC. As described above, according to the second embodiment of the present invention, since spatially adjacent groups receive touch pulses in different periods from multiplexers and thus signal interference does not occur between the adjacent groups, a signal to noise ratio (SNR) may be improved in a touch sensing operation.

The touch control unit TCU provides touch pulses and common voltages to the touch display panel TDP through the drive-integrated circuit D-IC, and receives touch sensing signals through the drive-integrated circuit D-IC. In this case, since the number of channels (e.g., 80) of the touch control unit TCU is less than the number of channels (e.g., 240) of the drive-integrated circuit D-IC, the touch control unit TCU provides 80 touch pulses to each of the first to third groups in a sequential manner through the first to third multiplexers Mux1 to Mux3 of the drive-integrated circuit D-IC.

The drive-integrated circuit D-IC of the touch display device according to the second embodiment may drive gate lines in one of the interlaced scan modes used in FIGS. 3, 5, 6, and 7. In this case, the touch control unit TCU according to the second embodiment may sequentially provide touch pulses on a group basis by utilizing a touch sensing period. For example, the touch control unit TCU according to the second embodiment may apply touch pulses to the touch blocks TB of the first group during a touch sensing period included in the first field period FP1 of FIG. 3, apply touch pulses to the touch blocks TB of the second group during a touch sensing period included in the second field period FP2, apply touch pulses to the touch blocks TB of the third group during a touch sensing period included in the third field period FP3, and apply touch pulses to the touch blocks TB of one of the first to third groups during a touch sensing period included in the fourth field period FP4.

Like the touch control unit TCU according to the second embodiment, the touch control unit TCU according to the first embodiment may also sequentially provide touch pulses on a group basis by utilizing a touch sensing period.

According to the present invention, a touch display device and a method for driving the same may achieve the following effects.

First, since all gate lines are driven during at least two field periods and a touch sensing operation is performed using an interlaced scan mode, sufficient gate driving time and touch sensing time may be ensured.

Second, since a gate driver is driven in an interlaced scan mode, power consumption may be reduced.

Third, when a gate driver operates according to a 4field-4scan type interlaced scan mode, since gate lines are driven in every field period without skipping any one field period, luminance deviation per line may be reduced.

Fourth, since spatially adjacent groups receive touch pulses in different periods from multiplexers and thus signal interference does not occur between the adjacent groups, a signal to noise ratio (SNR) may be improved in a touch sensing operation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A touch display device, comprising:
   a touch display panel for displaying an image corresponding to a touch applied from outside the touch display device, the touch display panel including a plurality of touch blocks, each having a touch sensor;
   a gate driver for sequentially driving all gate lines GL1 to GLi (i is a natural number greater than or equal to 4) of the touch display panel once during a unit field period comprising k continuous field periods (k is a natural number greater than or equal to 2) in sequence from a first field period to a (k)th field period, i being a multiple of k and greater than or equal to 2*k; and a touch controller configured to define periods of the unit field period other than gate driving periods as touch sensing periods, and to apply touch pulses to the touch blocks to sense a touch on the touch display panel during the touch sensing periods, wherein the gate driver is configured to sequentially drive (k*n+1)th gate lines (n is a natural number from 0 to the largest natural number less than i/k) during respective gate driving periods within the first field period, and to sequentially drive (k*n+m)th gate lines (m is a natural number from 2 to k corresponding to a second field period to the (k)th field period, respectively) during respective gate driving periods within a respective (m)th field period, and wherein one of the gate driving periods within the first field period is separated from a next one of the gate driving periods within the first field period by an interval having a length of two or more horizontal periods.

2. The touch display device according to claim 1, wherein the touch controller defines periods of the first field period other than the gate driving periods in which the (k*n+1)th gate lines are driven, and periods of the respective (m)th field period other than gate driving periods in which the (k*n+m)th gate lines are driven, as the touch sensing periods.

3. The touch display device of claim 1, wherein the touch controller is configured to perform a touch sensing operation only during the touch sensing periods without performing the touch sensing operation during the gate driving periods of the first field period or of the respective (m)th field period.

4. The touch display device of claim 1, wherein one of the gate driving periods within the respective (m)th field period is separated from a next one of the gate driving periods within the respective (m)th field period by an interval having a length of two or more horizontal periods.

5. The touch display device of claim 1, wherein the interval having a length of two or more horizontal periods is one of the touch sensing periods.

6. The touch display device of claim 1, wherein i is greater than or equal to 8, and k is greater than or equal to 4.

7. A touch display device, comprising:

a touch display panel for displaying an image corresponding to a touch applied from outside the touch display device, the touch display panel including a plurality of touch blocks, each having a touch sensor;

a gate driver for sequentially driving all gate lines GL1 to GLi (i is a natural number greater than or equal to 4) of the touch display panel once during a unit field period comprising k continuous field periods (k is an even number greater than or equal to 2) in sequence from a first field period to a (k)th field period, i being a multiple of k and greater than or equal to 2*k; and a touch controller configured to define periods of the unit field period other than gate driving periods as touch sensing periods, and to apply touch pulses to the touch blocks to sense a touch on the touch display panel during the touch sensing periods, wherein the gate driver sequentially drives ((k/2)*n+1)th gate lines (n is a natural number from 0 to the largest natural number less than i/(k/2)) during respective gate driving periods within the first field period, drives no gate line during each even field period, and sequentially drives ((k/2)*n+((m+1)/2))th gate lines (m is an odd number corresponding to an odd field period and less than or equal to (k−1)) during respective gate driving periods within a (m)th field period, wherein one of the gate driving periods within the first field period is separated from a next one of the gate driving periods within the first field period by an interval having a length of two or more horizontal periods, and wherein the touch controller defines periods of the first field period other than the gate driving periods in which the ((k/2)*n+1)th gate lines are driven, each even field period, and periods of the (m)th field period other than the gate driving periods in which the ((k/2)*n+((m+1)/2))th gate lines are driven, as the touch sensing periods.

8. The touch display device of claim 7, wherein the touch controller is configured to perform a touch sensing operation only during the touch sensing periods without performing the touch sensing operation during the gate driving periods of the first field period or of the respective (m)th field period.

9. The touch display device of claim 7, wherein one of the gate driving periods within the (m)th field period is separated from a next one of the gate driving periods within the (m)th field period by an interval having a length of two or more horizontal periods.

10. The touch display device of claim 7, wherein the interval having a length of two or more horizontal periods is one of the touch sensing periods.

11. The touch display device of claim 7, wherein i is greater than or equal to 8, and k is greater than or equal to 4.

* * * * *